US012772217B2

(12) United States Patent
Van Phan et al.

(10) Patent No.: US 12,772,217 B2
(45) Date of Patent: Oct. 20, 2026

(54) TRANSMITTING SIGNAL ON CO-CHANNEL RESOURCES

(71) Applicant: Nokia Technologies Oy, Espoo (FI)

(72) Inventors: Vinh Van Phan, Oulu (FI); Torsten Wildschek, Gloucester (GB); Thomas Haaning Jacobsen, Aalborg (DK); Faranaz Sabouri-Sichani, Aalborg (DK); Ling Yu, Espoo (FI); Jari Olavi Lindholm, Espoo (FI)

(73) Assignee: Nokia Technologies Oy, Espoo (FI)

( * ) Notice: Subject to any disclaimer, the term of this patent is extended or adjusted under 35 U.S.C. 154(b) by 346 days.

(21) Appl. No.: 18/407,194

(22) Filed: Jan. 8, 2024

(65) Prior Publication Data

US 2024/0284416 A1 Aug. 22, 2024

(30) Foreign Application Priority Data

Feb. 17, 2023 (FI) ..................................... 20235190

(51) Int. Cl.
*H04W 72/40* (2023.01)
*H04W 72/0446* (2023.01)

(52) U.S. Cl.
CPC ....... *H04W 72/0446* (2013.01); *H04W 72/40* (2023.01)

(58) Field of Classification Search
CPC .......................... H04W 72/0446; H04W 72/40
USPC .......................................................... 370/329
See application file for complete search history.

(56) References Cited

U.S. PATENT DOCUMENTS

| | | | | |
|---|---|---|---|---|
| 12,543,197 | B2 * | 2/2026 | Yoon | H04B 17/328 |
| 2021/0007081 | A1 | 1/2021 | Shin et al. | |
| 2022/0201654 | A1 * | 6/2022 | Lee | H04L 5/0053 |
| 2022/0210768 | A1 | 6/2022 | Zhou et al. | |
| 2022/0232575 | A1 | 7/2022 | Lee et al. | |
| 2022/0353035 | A1 * | 11/2022 | Ko | H04W 64/00 |
| 2023/0209596 | A1 * | 6/2023 | Wu | H04W 72/02 370/329 |
| 2023/0354270 | A1 * | 11/2023 | Lee | H04W 72/1215 |
| 2023/0354387 | A1 * | 11/2023 | Niu | H04W 72/40 |
| 2025/0023674 | A1 * | 1/2025 | Sun | H04L 5/0051 |
| 2025/0338297 | A1 * | 10/2025 | Kang | H04W 72/40 |
| 2025/0386371 | A1 * | 12/2025 | Chien | H04W 4/40 |
| 2026/0006625 | A1 * | 1/2026 | Lei | H04L 1/1854 |

OTHER PUBLICATIONS

"WID revision: NR sidelink evolution", 3GPP TSG RAN Meeting #98-e, RP-222806, Agenda: 9.3.1.5, OPPO, Dec. 12-16, 2022, 6 pages.

"3rd Generation Partnership Project; Technical Specification Group Radio Access Network; Overall description of Radio Access Network (RAN) aspects for Vehicle-to-everything (V2X) based on LTE and NR (Release 17)", 3GPP TR 37.985, V17.1.1 , Mar. 2022, pp. 1-38.

(Continued)

*Primary Examiner* — Robert J Lopata
(74) *Attorney, Agent, or Firm* — Barta Jones, PLLC

(57) ABSTRACT

Disclosed is a method comprising determining whether one or more physical sidelink feedback channel symbols are allocated in at least one time slot; and transmitting, based on the determination, a signal on one or more co-channel resources in the at least one time slot.

17 Claims, 8 Drawing Sheets

(56) References Cited

OTHER PUBLICATIONS

"Co-Channel Coexistence between LTE SL and NR SL", 3GPP TSG RAN WG1 Meeting #111, R1-2212119, Agenda: 9.4.2, Qualcomm Incorporated, Nov. 14-18, 2022, 15 pages.
"IEEE 802.11", Wikipedia, Retrieved on Dec. 1, 2023, Webpage available at : https://en.wikipedia.org/wiki/IEEE_802. 11.
"IEEE 802.15", Wikipedia, Retrieved on Dec. 11, 2023, Webpage available at : https://en.wikipedia.org/wiki/IEEE_802.15.
Office action received for corresponding Finnish Patent Application No. 20235190, dated Jul. 28, 2023, 10 pages.
Garcia et al., "A tutorial on 5G Nr V2X communications", IEEE Communications Surveys & Tutorials, vol. 23, No. 3, thirdquarter 2021, pp. 1972-2026.

* cited by examiner

TRANSMITTING SIGNAL ON CO-CHANNEL RESOURCES

RELATED APPLICATION

This application was originally filed as a FI national application No. 20235190 filed on Feb. 17, 2023, which is hereby incorporated in its entirety.

FIELD

The following example embodiments relate to wireless communication.

BACKGROUND

In wireless communication, there is a challenge in how to enable co-channel coexistence, i.e., the coexistence of different wireless communication devices in the same radio resources.

BRIEF DESCRIPTION

The scope of protection sought for various example embodiments is set out by the independent claims. The example embodiments and features, if any, described in this specification that do not fall under the scope of the independent claims are to be interpreted as examples useful for understanding various embodiments.

According to an aspect, there is provided an apparatus comprising at least one processor, and at least one memory storing instructions that, when executed by the at least one processor, cause the apparatus at least to: determine whether one or more physical sidelink feedback channel symbols are allocated in at least one time slot; and transmit, based on the determination, a signal on one or more co-channel resources in the at least one time slot.

According to another aspect, there is provided an apparatus comprising: means for determining whether one or more physical sidelink feedback channel symbols are allocated in at least one time slot; and means for transmitting, based on the determination, a signal on one or more co-channel resources in the at least one time slot.

According to another aspect, there is provided a method comprising: determining whether one or more physical sidelink feedback channel symbols are allocated in at least one time slot; and transmitting, based on the determination, a signal on one or more co-channel resources in the at least one time slot.

According to another aspect, there is provided a computer program comprising instructions which, when executed by an apparatus, cause the apparatus to perform at least the following: determining whether one or more physical sidelink feedback channel symbols are allocated in at least one time slot; and transmitting, based on the determination, a signal on one or more co-channel resources in the at least one time slot.

According to another aspect, there is provided a computer readable medium comprising program instructions which, when executed by an apparatus, cause the apparatus to perform at least the following: determining whether one or more physical sidelink feedback channel symbols are allocated in at least one time slot; and transmitting, based on the determination, a signal on one or more co-channel resources in the at least one time slot.

According to another aspect, there is provided a non-transitory computer readable medium comprising program instructions which, when executed by an apparatus, cause the apparatus to perform at least the following: determining whether one or more physical sidelink feedback channel symbols are allocated in at least one time slot; and transmitting, based on the determination, a signal on one or more co-channel resources in the at least one time slot.

LIST OF DRAWINGS

In the following, various example embodiments will be described in greater detail with reference to the accompanying drawings, in which FIG. 1 illustrates an example of a wireless communication network;

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Some example embodiments described herein may be implemented in a wireless communication network comprising a radio access network based on one or more of the following radio access technologies: Global System for Mobile Communications (GSM) or any other second generation radio access technology, Universal Mobile Telecommunication System (UMTS, 3G) based on basic wideband-code division multiple access (W-CDMA), high-speed packet access (HSPA), Long Term Evolution (LTE), LTE-Advanced, fourth generation (4G), fifth generation (5G), 5G new radio (NR), 5G-Advanced (i.e., 3GPP NR Rel-18 and beyond), or sixth generation (6G). Some examples of radio access networks include the universal mobile telecommunications system (UMTS) radio access network (UTRAN), the Evolved Universal Terrestrial Radio Access network (E-UTRA), or the next generation radio access network (NG-RAN). The wireless communication network may further comprise a core network, and some example embodiments may also be applied to network functions of the core network.

It should be noted that the embodiments are not restricted to the wireless communication network given as an example, but a person skilled in the art may also apply the solution to other wireless communication networks or systems provided with necessary properties. For example, some example embodiments may also be applied to a communication system based on IEEE 802.11 specifications, or a communication system based on IEEE 802.15 specifications.

Figure 1:
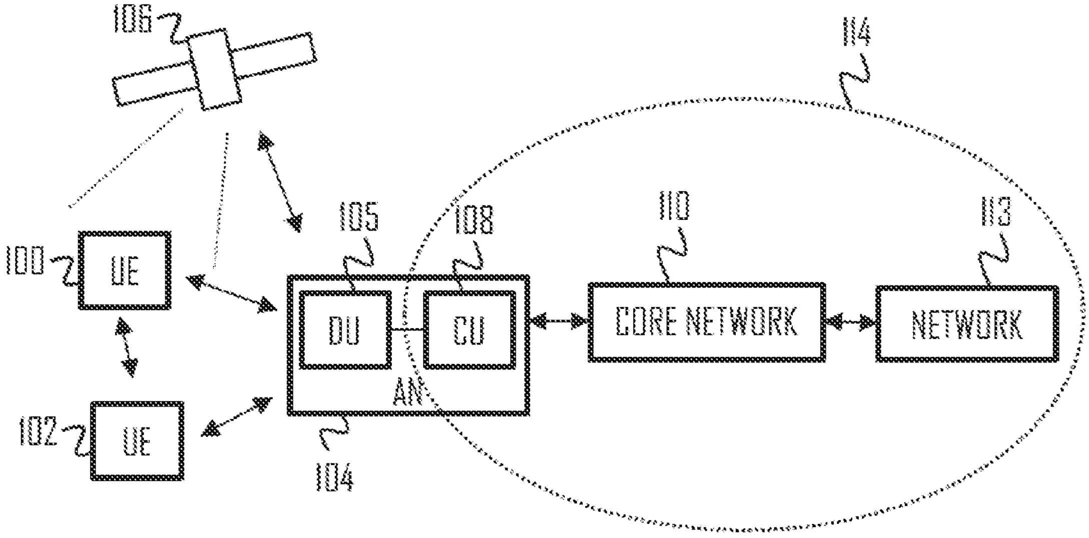

FIG. 1 depicts an example of a simplified wireless communication network showing some physical and logical entities. The connections shown in FIG. 1 may be physical connections or logical connections. It is apparent to a person skilled in the art that the wireless communication network may also comprise other physical and logical entities than those shown in FIG. 1.

The example embodiments described herein are not, however, restricted to the wireless communication network given as an example but a person skilled in the art may apply the embodiments described herein to other wireless communication networks provided with necessary properties.

The example wireless communication network shown in FIG. 1 includes an access network, such as a radio access network (RAN), and a core network 110.

FIG. 1 shows user equipment (UE) 100, 102 configured to be in a wireless connection on one or more communication channels in a radio cell with an access node (AN) 104 of an access network. The AN 104 may be an evolved Node B (abbreviated as eNB or eNodeB) or a next generation Node B (abbreviated as gNB or gNodeB), providing the radio cell. The wireless connection (e.g., radio link) from a UE to the access node 104 may be called uplink (UL) or reverse link, and the wireless connection (e.g., radio link) from the access node to the UE may be called downlink (DL) or forward link. UE 100 may also communicate directly with UE 102, and vice versa, via a wireless connection generally referred to as a sidelink (SL). It should be appreciated that the access node 104 or its functionalities may be implemented by using any node, host, server or access point etc. entity suitable for providing such functionalities.

The access network may comprise more than one access node, in which case the access nodes may also be configured to communicate with one another over links, wired or wireless. These links between access nodes may be used for sending and receiving control plane signaling and also for routing data from one access node to another access node.

The access node may comprise a computing device configured to control the radio resources of the access node. The access node may also be referred to as a base station, a base transceiver station (BTS), an access point, a radio access node or any other type of node capable of being in a wireless connection with a UE (e.g., UEs 100, 102). The access node may include or be coupled to transceivers. From the transceivers of the access node, a connection may be provided to an antenna unit that establishes bi-directional radio links to UEs 100, 102. The antenna unit may comprise an antenna or antenna element, or a plurality of antennas or antenna elements.

The access node 104 may further be connected to a core network (CN) 110. The core network 110 may comprise an evolved packet core (EPC) network and/or a $5^{th}$ generation core network (5GC). The EPC may comprise network entities, such as a serving gateway (S-GW for routing and forwarding data packets), a packet data network gateway (P-GW) for providing connectivity of UEs to external packet data networks, and a mobility management entity (MME). The 5GC may comprise network functions, such as a user plane function (UPF), an access and mobility management function (AMF), and a location management function (LMF).

The core network 110 may also be able to communicate with one or more external networks 113, such as a public switched telephone network or the Internet, or utilize services provided by them. For example, in 5G wireless communication networks, the UPF of the core network 110 may be configured to communicate with an external data network via an N6 interface. In LTE wireless communication networks, the P-GW of the core network 110 may be configured to communicate with an external data network.

The illustrated UE 100, 102 is one type of an apparatus to which resources on the air interface may be allocated and assigned. The UE 100, 102 may also be called a wireless communication device, a subscriber unit, a mobile station, a remote terminal, an access terminal, a user terminal, a terminal device, or a user device just to mention but a few names. The UE may be a computing device operating with or without a subscriber identification module (SIM), including, but not limited to, the following types of computing devices: a mobile phone, a smartphone, a personal digital assistant (PDA), a handset, a computing device comprising a wireless modem (e.g., an alarm or measurement device, etc.), a laptop computer, a desktop computer, a tablet, a game console, a notebook, a multimedia device, a reduced capability (RedCap) device, a wearable device (e.g., a watch, earphones or eyeglasses) with radio parts, a sensor comprising a wireless modem, or any computing device comprising a wireless modem integrated in a vehicle.

Any feature described herein with a UE may also be implemented with a corresponding apparatus, such as a relay node. An example of such a relay node may be a layer 3 relay (self-backhauling relay) towards the access node. The self-backhauling relay node may also be called an integrated access and backhaul (IAB) node. The IAB node may comprise two logical parts: a mobile termination (MT) part, which takes care of the backhaul link(s) (i.e., link(s) between IAB node and a donor node, also known as a parent node) and a distributed unit (DU) part, which takes care of the access link(s), i.e., child link(s) between the IAB node and UE(s), and/or between the IAB node and other IAB nodes (multi-hop scenario).

Another example of such a relay node may be a layer 1 relay called a repeater. The repeater may amplify a signal received from an access node and forward it to a UE, and/or amplify a signal received from the UE and forward it to the access node.

It should be appreciated that a UE may also be a nearly exclusive uplink-only device, of which an example may be a camera or video camera loading images or video clips to a network. A UE may also be a device having capability to operate in an Internet of Things (IoT) network, which is a scenario in which objects may be provided with the ability to transfer data over a network without requiring human-to-human or human-to-computer interaction. The UE may also utilize cloud. In some applications, the computation may be carried out in the cloud or in another UE.

The wireless communication network may also be able to support the usage of cloud services, for example at least part of core network operations may be carried out as a cloud service (this is depicted in FIG. 1 by "cloud" 114). The communication system may also comprise a central control entity, or the like, providing facilities for wireless communication networks of different operators to cooperate for example in spectrum sharing.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question may have inherent mobility, are a subcategory of cyber-physical systems. Examples of mobile physical systems include mobile robotics and electronics transported by humans or animals.

5G enables using multiple input-multiple output (MIMO) antennas in the access node 104 and/or the UE 100, 102, many more base stations or access nodes than an LTE network (a so-called small cell concept), including macro sites operating in co-operation with smaller stations and employing a variety of radio technologies depending on service needs, use cases and/or spectrum available. 5G wireless communication networks may support a wide range of use cases and related applications including video streaming, augmented reality, different ways of data sharing and various forms of machine type applications, such as (massive) machine-type communications (mMTC), including vehicular safety, different sensors and real-time control.

In 5G wireless communication networks, access nodes and/or UEs may have multiple radio interfaces, namely below 6 GHz, cmWave and mmWave, and also being integrable with existing legacy radio access technologies, such as the LTE. Integration with the LTE may be implemented, for example, as a system, where macro coverage may be provided by the LTE, and 5G radio interface access may come from small cells by aggregation to the LTE. In other words, a 5G wireless communication network may support both inter-RAT operability (such as LTE-5G) and inter-RI operability (inter-radio interface operability, such as below 6 GHz-cmWave-mmWave). One of the concepts considered to be used in 5G wireless communication networks may be network slicing, in which multiple independent and dedicated virtual sub-networks (network instances) may be created within the substantially same infrastructure to run services that have different requirements on latency, reliability, throughput and mobility.

In some example embodiments, an access node (e.g., access node 104) may comprise: a radio unit (RU) comprising a radio transceiver (TRX), i.e., a transmitter (Tx) and a receiver (Rx); one or more distributed units (DUs) 105 that may be used for the so-called Layer 1 (L1) processing and real-time Layer 2 (L2) processing; and a central unit (CU) 108 (also known as a centralized unit) that may be used for non-real-time L2 and Layer 3 (L3) processing. The CU 108 may be connected to the one or more DUs 105 for example via an F1 interface. Such an embodiment of the access node may enable the centralization of CUs relative to the cell sites and DUs, whereas DUs may be more distributed and may even remain at cell sites. The CU and DU together may also be referred to as baseband or a baseband unit (BBU). The CU and DU may also be comprised in a radio access point (RAP).

The CU 108 may be a logical node hosting radio resource control (RRC), service data adaptation protocol (SDAP) and/or packet data convergence protocol (PDCP), of the NR protocol stack for an access node. The DU 105 may be a logical node hosting radio link control (RLC), medium access control (MAC) and/or physical (PHY) layers of the NR protocol stack for the access node. The operations of the DU may be at least partly controlled by the CU. It should also be understood that the distribution of functions between DU 105 and CU 108 may vary depending on implementation. The CU may comprise a control plane (CU-CP), which may be a logical node hosting the RRC and the control plane part of the PDCP protocol of the NR protocol stack for the access node. The CU may further comprise a user plane (CU-UP), which may be a logical node hosting the user plane part of the PDCP protocol and the SDAP protocol of the CU for the access node.

Cloud computing systems may also be used to provide the CU 108 and/or DU 105. A CU provided by a cloud computing system may be referred to as a virtualized CU (vCU). In addition to the vCU, there may also be a virtualized DU (vDU) provided by a cloud computing system. Furthermore, there may also be a combination, where the DU may be implemented on so-called bare metal solutions, for example application-specific integrated circuit (ASIC) or customer-specific standard product (CSSP) system-on-a-chip (SoC).

Edge cloud may be brought into the access network (e.g., RAN) by utilizing network function virtualization (NFV) and software defined networking (SDN). Using edge cloud may mean access node operations to be carried out, at least partly, in a computing system operationally coupled to a remote radio head (RRH) or a radio unit (RU) of an access node. It is also possible that access node operations may be performed on a distributed computing system or a cloud computing system located at the access node. Application of cloud RAN architecture enables RAN real-time functions being carried out at the access network (e.g., in a DU 105) and non-real-time functions being carried out in a centralized manner (e.g., in a CU 108).

It should also be understood that the distribution of functions between core network operations and access node operations may differ in future wireless communication networks compared to that of the LTE or 5G, or even be non-existent. Some other technology advancements that may be used include big data and all-IP, which may change the way wireless communication networks are being constructed and managed. 5G (or new radio, NR) wireless communication networks may support multiple hierarchies, where multi-access edge computing (MEC) servers may be placed between the core network 110 and the access node 104. It should be appreciated that MEC may be applied in LTE wireless communication networks as well.

A 5G wireless communication network ("5G network") may also comprise a non-terrestrial communication network, such as a satellite communication network, to enhance or complement the coverage of the 5G radio access network. For example, satellite communication may support the transfer of data between the 5G radio access network and the core network, enabling more extensive network coverage. Possible use cases may be providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). A given satellite 106 in the mega-constellation may cover several satellite-enabled network entities that create on-ground cells. The on-ground cells may be created through an on-ground relay access node or by an access node 104 located on-ground or in a satellite.

It is obvious for a person skilled in the art that the access node 104 depicted in FIG. 1 is just an example of a part of an access network (e.g., a radio access network) and in practice, the access network may comprise a plurality of access nodes, the UEs 100, 102 may have access to a plurality of radio cells, and the access network may also comprise other apparatuses, such as physical layer relay access nodes or other entities. At least one of the access nodes may be a Home eNodeB or a Home gNodeB. A Home gNodeB or a Home eNodeB is a type of access node that may be used to provide indoor coverage inside a home, office, or other indoor environment.

Additionally, in a geographical area of an access network (e.g., a radio access network), a plurality of different kinds of radio cells as well as a plurality of radio cells may be provided. Radio cells may be macro cells (or umbrella cells) which may be large cells having a diameter of up to tens of kilometers, or smaller cells such as micro-, femto- or pico-cells. The access node(s) of FIG. 1 may provide any kind of these cells. A cellular radio network may be implemented as a multilayer access networks including several kinds of radio cells. In multilayer access networks, one access node may provide one kind of a radio cell or radio cells, and thus a plurality of access nodes may be needed to provide such a multilayer access network.

For fulfilling the need for improving performance of access networks, the concept of "plug-and-play" access nodes may be introduced. An access network which may be able to use "plug-and-play" access nodes, may include, in addition to Home eNodeBs or Home gNodeBs, a Home Node B gateway, or HNB-GW (not shown in FIG. 1). An HNB-GW, which may be installed within an operator's access network, may aggregate traffic from a large number of Home eNodeBs or Home gNodeBs back to a core network of the operator.

Some example embodiments relate to sidelink (SL) co-channel coexistence for example between different radio access technologies (e.g., LTE and NR).

In wireless communication, co-channel coexistence refers to the ability of multiple wireless communication devices (e.g., UEs) to share the same radio resources (e.g., carrier frequency) without causing significant interference to one another. However, it may be challenging to enable co-channel coexistence, for example, when the wireless communication devices are close to one another. Interference between wireless communication devices may cause performance degradation, increased power consumption, and reduced battery life. Interference may occur due to a variety of factors, including differences in transmission power, antenna patterns, modulation schemes, and other radio characteristics. Additionally, environmental factors such as buildings, trees, and other physical obstructions may impact the ability to coexist.

For example, in vehicle-to-everything (V2X) sidelink communication scenarios, both LTE UEs and NR UEs may coexist in the same frequency channel. For the two different types of UEs to coexist while using a common carrier frequency, there needs to be a mechanism to efficiently utilize resource allocation by the two radio access technologies (i.e., LTE and NR) without negatively impacting the operation of a given radio access technology.

It should be noted that an LTE UE and an NR UE may also coexist in the same device. In this case, the LTE UE may be referred to as an LTE module and the NR UE may be referred to as an NR module of the UE device.

Some examples of co-channel coexistence of LTE and NR UEs in the same radio resources may include frequency-division multiplexing (FDM) coexistence, time-division multiplexing (TDM) coexistence, mixed FDM and TDM coexistence, coexistence of LTE and NR UEs in the same radio resources, where NR UEs have additional dedicated resources, and coexistence of LTE and NR UEs in the same radio resources, where NR UE accesses the resources opportunistically.

Figure 2:
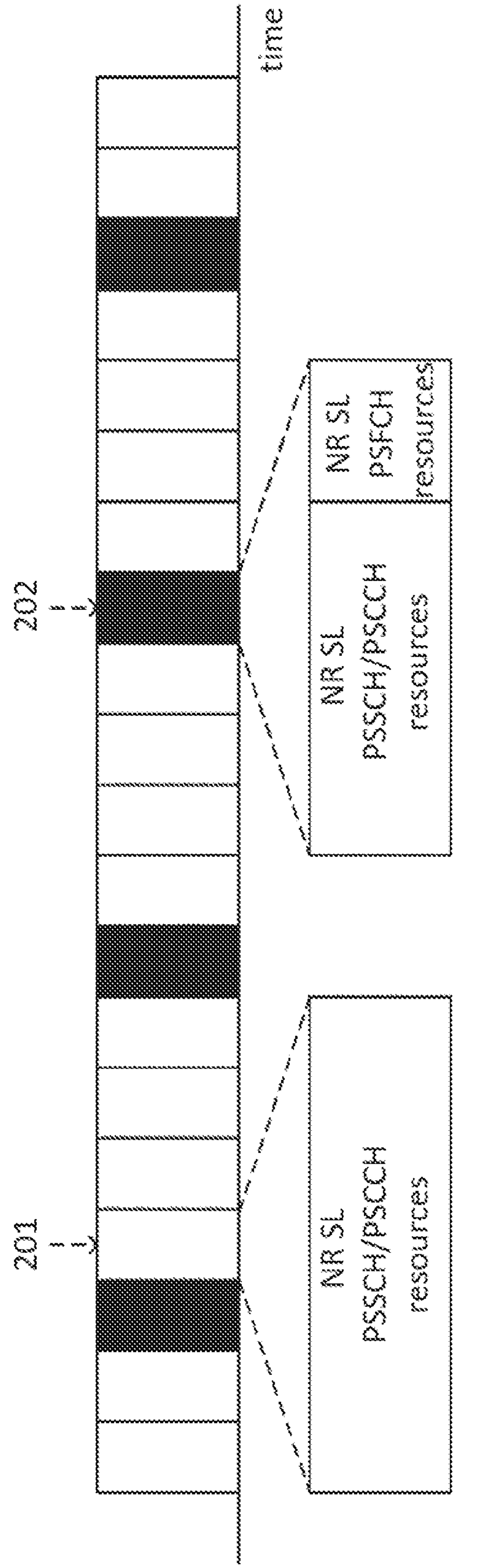
FIG. 2 illustrates an example of co-channel resources.

Sidelink co-channel coexistence between LTE and NR may support at least the case with subcarrier spacing of 15 kilohertz (kHz), in which the NR SL slot may be equal to the LTE SL subframe in time, as illustrated in FIG. 2.

FIG. 2 illustrates an example of co-channel resources for sidelink co-channel coexistence, where NR SL and LTE SL are synchronized, and the NR SL slot is fully overlapping with the LTE SL subframe.

In FIG. 2, the slot 201 illustrates an NR SL slot or LTE SL subframe, where physical sidelink shared channel (PSSCH) and/or physical sidelink control channel (PSCCH) resources are allocated (but no PSFCH resources are allocated in this slot). The slot 202 illustrates an NR SL slot or LTE SL subframe, where NR SL PSFCH resources are allocated in addition to the PSSCH and/or PSCCH resources. It is noted that NR SL PSFCH resources are specific to NR SL, and PSSCH and/or PSCCH resources for LTE SL may be overlapping with both the NR SL PSSCH and/or PSCCH resources and the NR SL PSFCH resources. Herein the term "slot" refers to a time slot.

SL transmissions with feedback control, such as hybrid automatic repeat request (HARQ) feedback, is not supported in LTE, but it is supported in NR. This is why different NR SL slots may have different structures depending on whether NR physical sidelink feedback channel (PSFCH) resources are allocated or not, as shown in FIG. 3A and FIG. 3B.

Figure 3A:
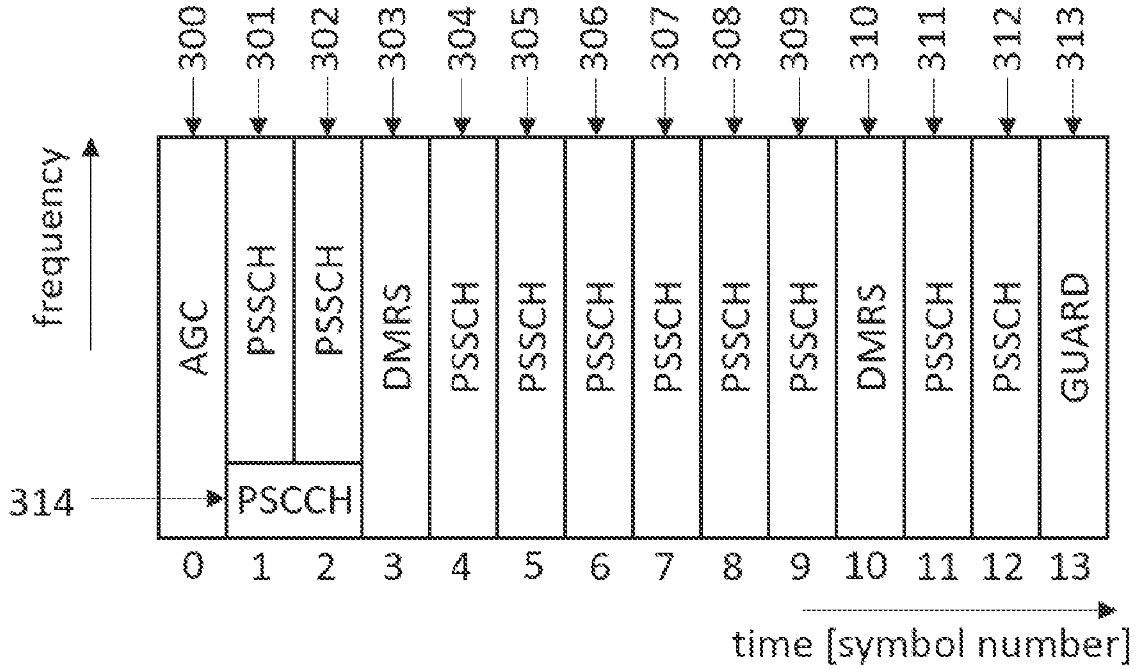
FIG. 3A illustrates an example of a slot.

FIG. 3A illustrates an example of an NR SL slot with PSSCH and PSCCH.

Figure 3B:
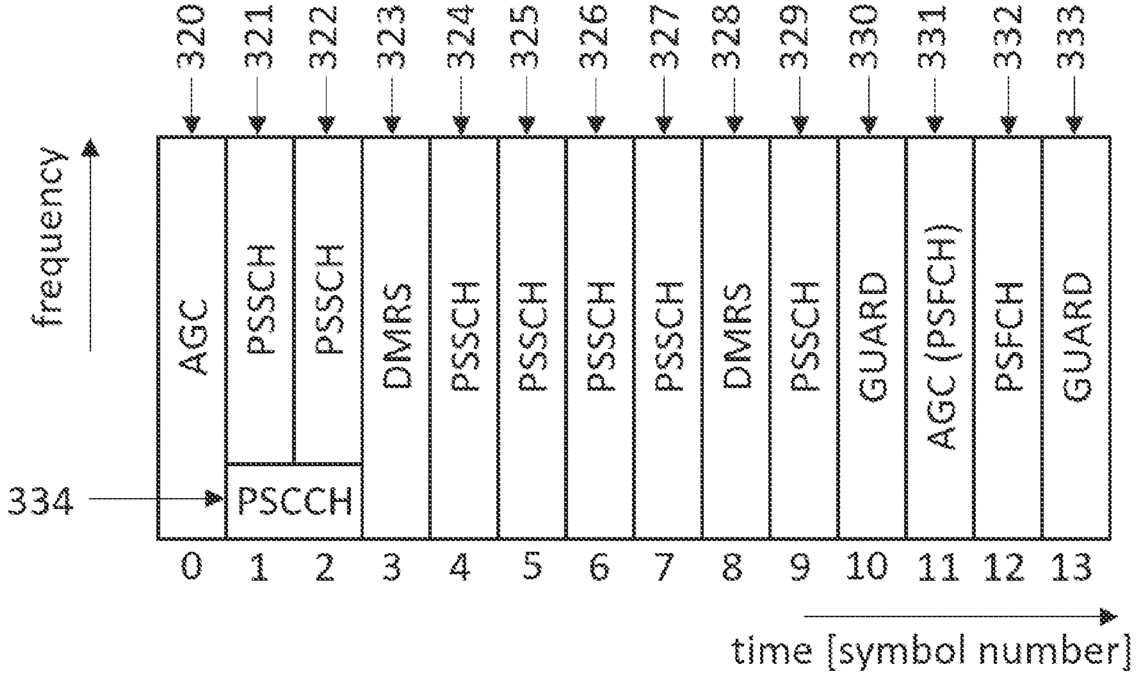
FIG. 3B illustrates an example of a slot.

FIG. 3B illustrates an example of an NR SL slot with PSSCH, PSCCH and PSFCH.

Figure 3C:
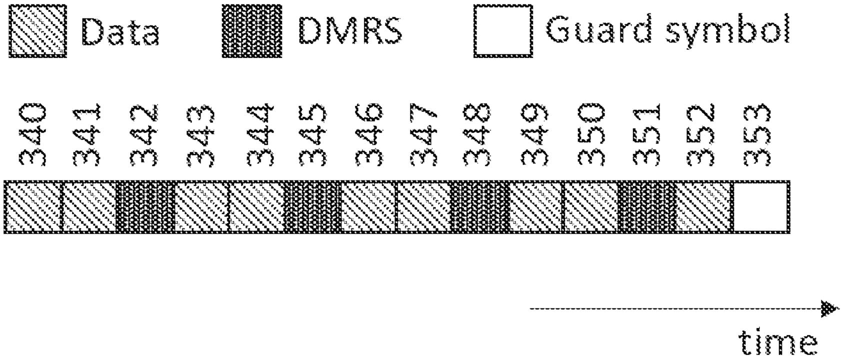
FIG. 3C illustrates an example of a subframe.

FIG. 3C illustrates an example of an LTE SL subframe format for PSSCH and PSCCH.

It should be noted that some example embodiments are not limited to the examples shown in FIGS. 3A, 3B and 3C. It is obvious to a person skilled in the art that the slot and subframe structures may also be different from what is shown in FIGS. 3A, 3B, and 3C.

PSSCH is a channel that may be used in 5G NR for data transmission between two UEs (without going through the gNB). A PSSCH symbol 301, 302, 304, 305, 306, 307, 308, 309, 311, 312, 321, 322, 324, 325, 326, 327, 329 is a time-domain symbol in the PSSCH that may carry user data or control information.

PSCCH is a channel that may be used in 5G NR to transmit control information for sidelink communication between UEs. The PSCCH bits may be interleaved with the PSSCH bits and mapped to the same set of resource elements 314, 334 as the PSSCH. The PSCCH may carry sidelink control information (SCI) that may be used to manage and configure sidelink communication between UEs. The SCI sent on PSCCH needs to be received in order to receive and decode the corresponding SL transmission on PSSCH. SCI may also be referred to as scheduling assignment for SL transmission.

PSFCH was introduced in NR Rel-15 to enable HARQ feedback over the sidelink from a UE that is the intended recipient of a PSSCH transmission (i.e., the Rx UE) to the UE that performed the transmission (i.e., the Tx UE). Within a PSFCH, a Zadoff-Chu sequence in one physical resource block (PRB) may be repeated over two orthogonal frequency-division multiplexing (OFDM) symbols 331, 332, the first of which may be used for automatic gain control (AGC) near the end of the sidelink resource in a slot. The Zadoff-Chu sequence as a base sequence may be (pre-) configured per sidelink resource pool.

An AGC symbol 300, 320, 331 is a specific symbol within a slot that may be reserved for setting the receiver gain level. For example, the AGC symbol may be placed at the beginning of a slot and it may be used to adjust the receiver gain based on the received signal strength. The goal of AGC is to maintain a constant received signal level at the receiver, regardless of the distance between the transmitter and receiver, to ensure optimal signal quality, and to minimize errors.

A guard symbol 313, 330, 333, 353 is a symbol that may be inserted between adjacent symbols to provide a guard interval in order to prevent inter-symbol interference (ISI) and inter-carrier interference (ICI). For example, the guard symbol may be a copy of the last symbol of a symbol sequence, and the guard symbol may be inserted before the first symbol of the next sequence. The length of the guard symbol may depend on the delay spread of the channel and the synchronization accuracy of the receiver.

In both NR and LTE, demodulation reference signal (DMRS) symbols 303, 310, 323, 328, 342, 345, 348, 351 may be used for channel estimation and demodulation of the data symbols 301, 302, 304, 305, 306, 307, 308, 309, 311, 312, 314, 321, 322, 324, 325, 326, 327, 329, 334, 340, 341, 343, 344, 346, 347, 349, 350, 352. The DMRS symbols may be inserted in specific locations within the slot or subframe, and the receiver may use these symbols to estimate the channel response between the transmitter and receiver. This estimation may be used to equalize the received signal and decode the data symbols sent by the transmitter. In addition to channel estimation, DMRS symbols may also be used for various other purposes, such as interference cancellation and rank indication in multi-antenna systems.

LTE SL mode 4 and NR SL mode 2 may be supported for sidelink co-channel coexistence, wherein the configured LTE SL transmission resource pool may at least partially overlap with the NR SL transmission resource pool. LTE SL mode 4 and NR SL mode 2 refer to the SL resource allocation modes, in which an SL UE may autonomously select resources from a configured transmission resource pool for SL transmission (instead of the network selecting the resources for the UE). It may be desirable to ensure that sidelink co-channel coexistence does not cause any notable impact to LTE SL specifications, while enhancements may be made to NR UEs.

An LTE SL UE may perform measurement of total received energy, for example sidelink received signal strength indicator (S-RSSI) measurement, on selectable sub-channels from the configured resource pool and use the measurement results for resource selection, as a way to account for SL transmissions, which were not found during decoding of LTE SL PSCCHs for LTE SL mode 4 operation. Considering sidelink co-channel co-existence, as the LTE SL UE is not able to monitor NR sidelink control information (SCI) to find NR SL transmissions using co-channel resources, the LTE SL UE may have to rely on measurements of total received energy on selectable co-channel resources in order to avoid collisions with NR SL transmissions. To avoid collision between LTE and NR SL transmissions, simultaneous LTE and NR SL transmissions using co-channel resources over overlapping LTE SL subframe(s) and NR SL slot(s) should be avoided.

Thus, in order to prevent the LTE SL UE from selecting co-channel resources in LTE SL subframe(s) overlapping with NR SL slot(s), in which co-channel resources have already been reserved and used for NR SL transmissions, the NR SL transmissions on these NR SL slot(s) may need to ensure that the total received energy, as measured by the LTE SL UE over all the co-channel resources in the LTE SL subframe(s) overlapping with these NR SL slot(s), is high enough to be excluded or at least not likely to be selected by the LTE SL UE. This issue may become more challenging, when considering reservation of co-channel resources for NR SL transmissions in NR SL slot(s), where PSFCH resources are allocated (e.g., the PSFCH symbols 331, 332 in FIG. 3B). This is because resources in the last four symbols of such slot (nearly one third of the slot) may or may not be used depending on how much of the PSFCH resources are used for transmitting, for example, NR SL HARQ feedback or inter-UE coordination (IUC) information. Furthermore, NR SL transmission(s) in the first 10 symbols may be of NR SL short-range unicast with power control based on SL pathloss (as opposed to LTE SL transmissions using LTE SL broadcast with channel busy ratio (CBR) based maximum transmission power). Such NR SL short-range unicast transmissions may not be enough to ensure that the total received energy, as measured by the LTE SL UE over all the co-channel resources in the LTE SL subframe(s) overlapping with the NR SL slot(s), is high enough.

For example, the LTE SL UE may perform sensing over a window of up to 1000 milliseconds (ms). Because LTE SL traffic for V2X is mainly broadcast and periodical, even without decoding LTE SCI from other LTE SL UEs for sensing, the LTE SL UE may be able to determine patterns of subframes or sub-channel resources thereof where the total received energy is high and therefore avoid selecting resources in such patterns for its transmissions. And, additionally, monitoring SCI from other UE provides further information about future reserved resources for the sensing operation. Furthermore, a physical measurement of CBR may be performed for each subframe, wherein the UE determines a resource in a resource pool which has a high received signal energy (e.g., RSSI) in the most recent 100 subframes. CBR is a measurement of the congestion present recently in the resource pool. Another measurement applicable for channel occupancy ratio (CR), counts the total number of subchannels an LTE SL UE has and will transmit during a window of up to 1000 ms including the current subframe. CR is thus a measurement of how much resource (s) an LTE SL UE has recently, and will soon, claim. Such high-energy resources may not be selected for own communication.

One possible solution for sidelink co-channel coexistence is that NR SL PSCCH and PSSCH co-channel resources in all the LTE SL subframes, where NR SL PSFCH resources are located, will be occupied by NR UEs, thus forcing LTE UEs to use other co-channel resources automatically. Therefore, an NR UE that has a need to transmit on PSFCH (e.g., HARQ feedback) may transmit without further consideration (e.g., whether its PSFCH transmission may cause negative impact such as collision or AGC issue to LTE UE or not). Thus, there is a need to ensure the reservation of co-channel resources for NR SL transmissions in all NR SL slots, where PSFCH resources are allocated.

Some example embodiments may provide a method for boosting the transmitted energy of NR SL transmissions on co-channel resources in NR SL slot(s), where PSFCH resources are allocated, to help ensure that the total received energy (e.g., S-RSSI), as measured by an LTE SL UE on these co-channel resources, is high enough to reduce the probability that the LTE SL UE selects these co-channel resources for its own transmission.

In an example embodiment, an NR UE may be configured to transmit an NR SL energy-boosting signal (EBS) in one or more NR SL slot(s), where NR SL PSFCH resources are allocated. For example, the EBS may be transmitted by utilizing at least a part of a guard symbol (e.g., the guard symbol 330 in FIG. 3B) and/or at least a part of one or more PSFCH resources (e.g., PSFCH symbols 331, 332 in FIG. 3B) of the one or more NR SL slot(s).

Regular PSFCH transmission is meant for sending some meaningful networking information, such as HARQ feedback from a receiver UE to a transmitter UE, or inter-UE coordination information to one or more targeted UEs. On the other hand, the EBS is meant for boosting energy on the targeted slot(s) and may have no actual networking function, at least in some options. In other words, the EBS may not carry any information that would be carried by a regular PSFCH transmission. For example, the EBS may carry dummy bits, not intended to carry meaningful data.

Figure 4:
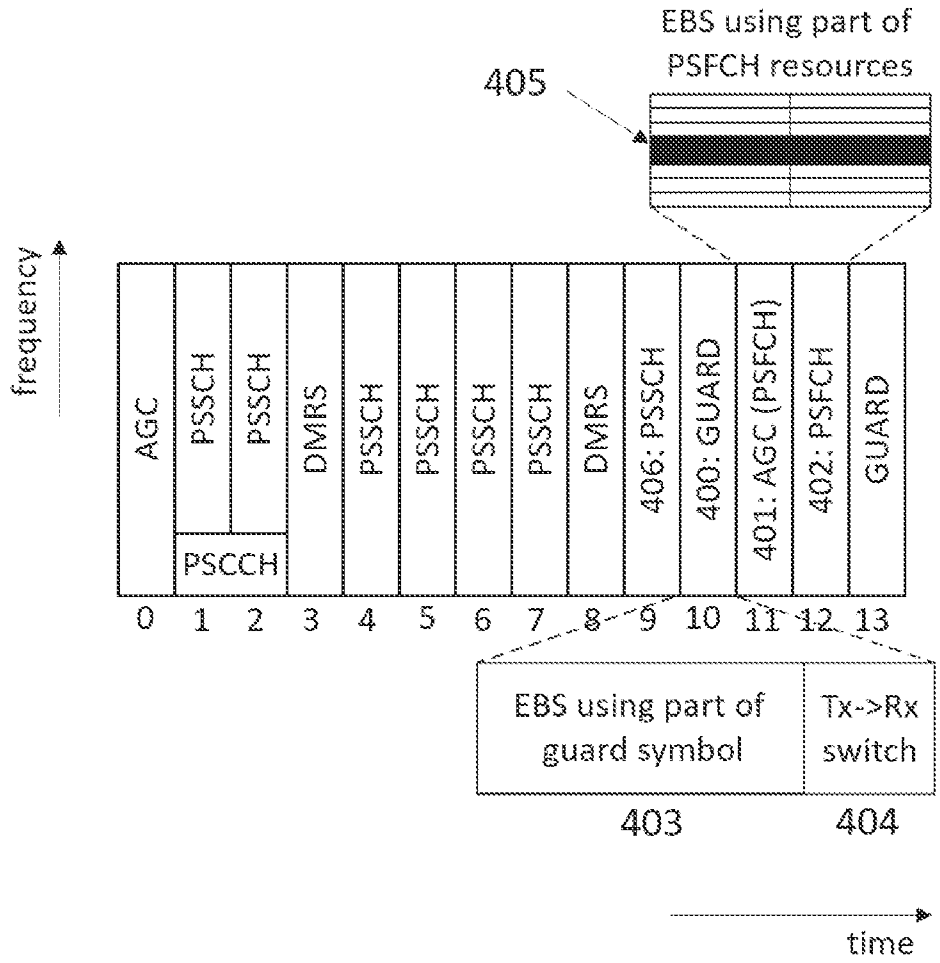
FIG. 4 illustrates an example of a slot, where an energy boosting signal is transmitted.

FIG. 4 illustrates an example of a slot, where the EBS is transmitted by using a part 403 of a guard symbol 400, and/or a part 405 of the PSFCH frequency resources in two PSFCH symbols 401, 402. The other part 404 of the guard symbol 400 may be reserved for switching between transmission and reception mode.

It should be noted that just a fraction of the guard symbol 400 may be sufficient for switching between transmission and reception mode (e.g., in cases with low subcarrier spacing). Moreover, in some cases, an NR SL UE may not need this switch at all, for example if it transmits PSSCH, PSCCH and PSFCH in the slot (i.e., no receiving needed), or if it transmits PSSCH and PSCCH but does not need to receive PSFCH.

It should be noted that some example embodiments are not limited to sidelink co-channel coexistence for NR and LTE. Some example embodiments may also be applied to any other radio access technologies.

Figure 5:
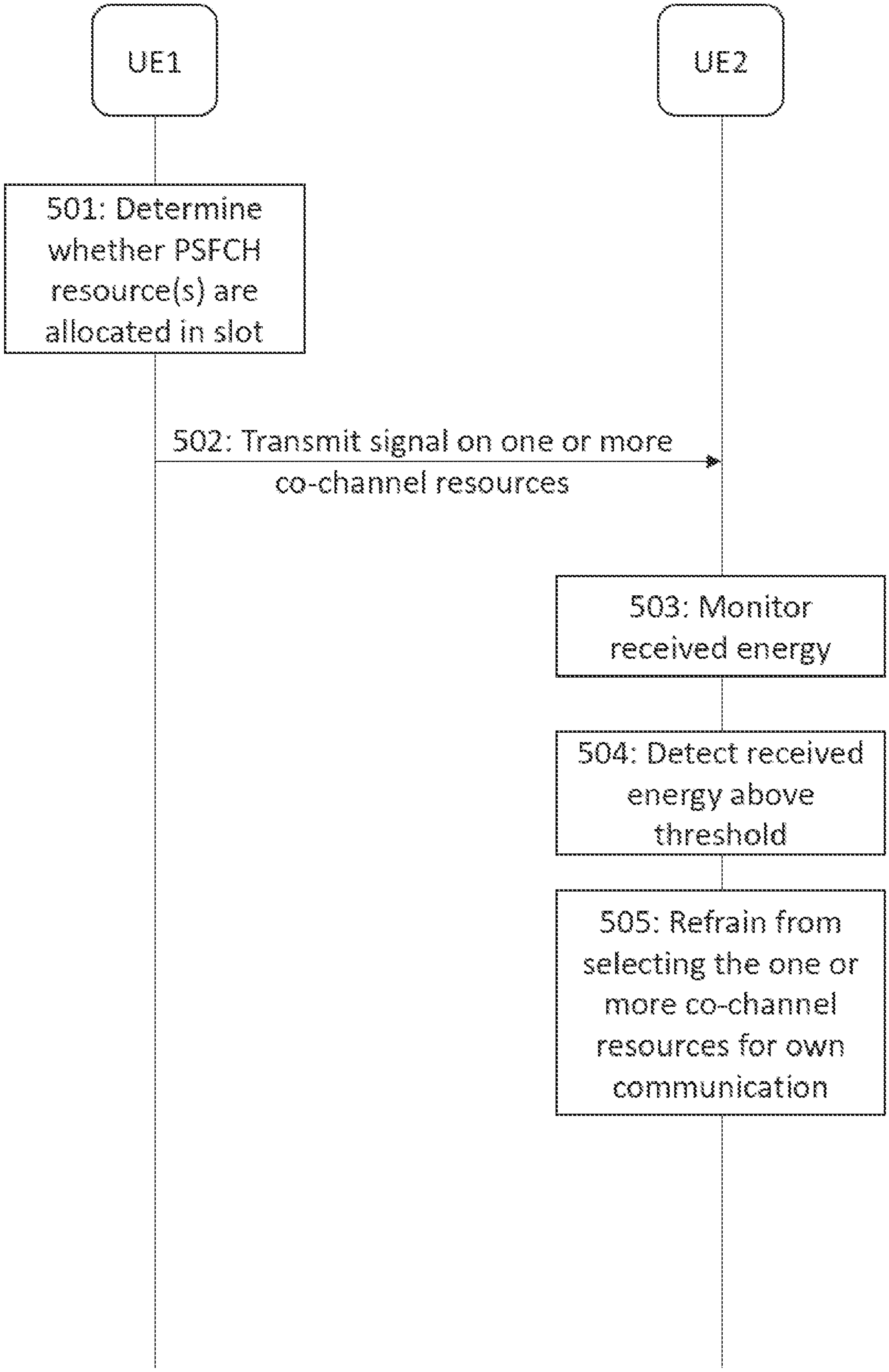
FIG. 5 illustrates a signal flow diagram.

FIG. 5 illustrates a signal flow diagram according to an example embodiment.

At 501, a first UE (UE1) determines whether one or more physical sidelink feedback channel symbols are allocated in at least one time slot. For example, the configuration of the resource pool may indicate which slots have PSFCH resources. Alternatively, or additionally, the first UE may detect the use of PSFCH slots by other UEs in proximity based on monitoring SCI in a sensing operation.

At 502, based on determining that one or more physical sidelink feedback channel symbols are allocated in the at least one time slot, the first UE transmits a signal (e.g., EBS) on one or more co-channel resources in the at least one time slot.

For example, the one or more co-channel resources may comprise at least one of: at least a part of a guard symbol in the at least one time slot (e.g., the part 403 of the guard symbol 400 in FIG. 4), or at least a part of the one or more physical sidelink feedback channel symbols in the at least one time slot (e.g., the part 405 of the PSFCH symbols 401, 402 in FIG. 4).

At 503, a second UE (UE2) monitors received energy (e.g., S-RSSI) on the one or more co-channel resources.

Co-channel resources refer to radio resources from the same frequency channel or carrier that may be shared by multiple UEs (e.g., UE1 and UE2) associated with different radio access technologies. For example, co-channel resources may comprise overlapping resources of an LTE SL resource pool and an NR SL resource pool configured for LTE SL and NR SL transmissions, respectively. Herein the terms 'first UE' and 'second UE' are used to distinguish the UEs, and it does not necessarily mean a specific order or specific identifiers of the UEs. The first UE may correspond to UE 100 of FIG. 1, and the second UE may correspond to UE 102 of FIG. 1. For example, the first UE may be an NR UE, and the second UE may be an LTE UE. The first UE and the second UE may be separate devices, or they may be comprised in the same device.

At 504, the second UE detects, based on the monitoring, that the received energy on the one or more co-channel resources at the second UE is above or equal to a threshold.

At 505, based on detecting that the received energy on the one or more co-channel resources is above or equal to the threshold, the second UE refrains from selecting the one or more co-channel resources for its own communication. In other words, when selecting resources for its own transmission, the second UE does not select the one or more co-channel resources, on which the signal was transmitted from the first UE. This way, the transmission of the signal from the first UE may cause the second UE to less likely select the one or more co-channel resources for a communication of the second UE.

Figure 6:
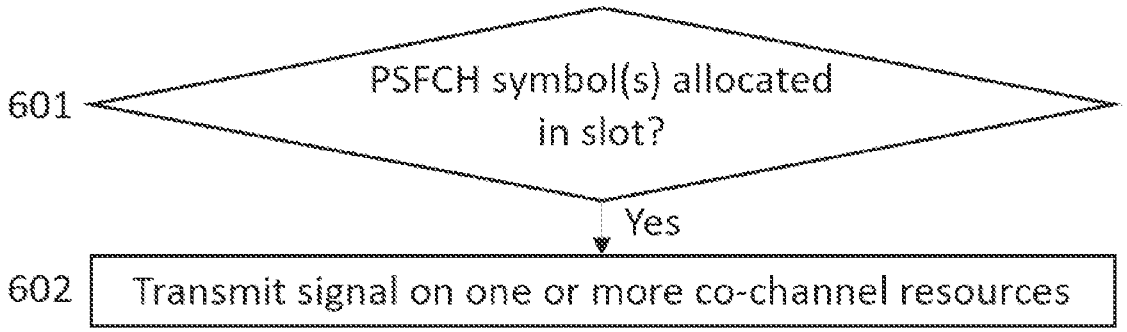
FIG. 6 illustrates a flow chart.

FIG. 6 illustrates a flow chart according to an example embodiment of a method performed by an apparatus. For example, the apparatus may be, or comprise, or be comprised in, a user equipment (UE). The user equipment may also be called a wireless communication device, a subscriber unit, a mobile station, a remote terminal, an access terminal, a user terminal, a terminal device, or user device. The apparatus may correspond to one of the UEs 100, 102 of FIG. 1, or UE1 of FIG. 5.

Referring to FIG. 6, in block 601, the apparatus determines whether one or more physical sidelink feedback channel symbols are allocated in at least one time slot.

In block 602, based on determining that one or more physical sidelink feedback channel symbols are allocated in the at least one time slot (block 601: yes), the apparatus transmits a signal on one or more co-channel resources in the at least one time slot. The signal may refer to the EBS described above.

For example, the one or more co-channel resources may comprise at least one of: at least a part of a guard symbol in the at least one time slot (e.g., the part 403 of the guard symbol 400 in FIG. 4), or at least a part of the one or more physical sidelink feedback channel symbols in the at least one time slot (e.g., the part 405 of the PSFCH symbols 401, 402 in FIG. 4). Herein a part may refer to at least one of: a part of time domain resources of the respective symbol, a part of frequency domain resources of the respective symbol, and/or a part of code domain resources of the respective symbol.

As explained above with reference to FIG. 5, the transmission of the signal may cause another user equipment monitoring received energy on the one or more co-channel resources to less likely select the one or more co-channel resources for a communication. For example, the signal may be transmitted such that the probability of received energy on the one or more co-channel resources at the other user equipment being above or equal to a threshold is increased. The threshold may be pre-determined, e.g. based on simulations, and known to the first UE.

The apparatus may comprise at least a user equipment associated with a first radio access technology, and the other user equipment monitoring the received energy may be associated with a second radio access technology different to the first radio access technology. For example, the apparatus may be an NR UE, and the other user equipment may be an LTE UE. As another example, the apparatus may be an NR UE, and the other user equipment may be a 6G UE. As another example, the apparatus may be a 6G UE, and the other user equipment may be an NR UE or an LTE UE.

The apparatus and the other user equipment may be separate devices. Alternatively, the apparatus may comprise the user equipment associated with both the first radio access technology and the second radio access technology. For example, the apparatus may comprise both an NR UE (NR module) and an LTE UE (LTE module).

The signal (EBS) and the one or more co-channel resources may be based on a pre-defined configuration shared between a plurality of user equipment associated with the first radio access technology. For example, the EBS as well as the co-channel resource(s) for transmitting EBS (e.g., in the symbols 400, 401, 402 of FIG. 4) may be pre-defined and commonly preconfigured to NR SL UEs. This may be specific to a respective resource pool and therefore a part of the respective resource pool configuration to NR SL UEs for example. Thus, one or more NR SL UEs may transmit the same EBS using the same resources, thereby boosting the total received energy over those resources. The EBS resources in the guard symbol may be flexible, whereas EBS resources in PSFCH symbols may need to be allocated such that EBS transmissions do not cause adverse effect to regular PSFCH transmissions. For example, exclusive resources (in terms of frequency domain and/or code domain, e.g., using different sequences) for EBS may be (pre-) configured such that they are not overlapping with resources for regular PFSCH transmissions, and separated enough from resources for regular PSFCH transmissions so that the adverse effect of in-band emissions (IBE) is limited.

In one example, the signal (EBS) may comprise a sequence that comprises information other than feedback information, wherein the sequence is transmitted on the one or more physical sidelink feedback channel symbols. For example, a dedicated sequence (i.e., sequence that is not used by any UE for feedback transmission) may be configured for EBS that is transmitted in the one or more co-channel resources (e.g., in PSFCH symbols 401, 402 in FIG. 4). The dedicated sequence means that the sequence may be exclusive to the EBS. For example, the dedicated sequence may just be a dummy sequence.

In one example, the at least part of the guard symbol may comprise a part of a physical sidelink shared channel transmission, wherein a transmit power of the signal (EBS) may correspond to a transmit power of the physical sidelink shared channel transmission. For example, the EBS 403 in the guard symbol 400 of FIG. 4 may be part of a PSSCH transmission of an NR SL UE in the same slot, i.e., the PSSCH transmission of the NR SL UE may be extended into the at least part of the guard symbol. This may be realized, for example, as a cyclic postfix of the PSSCH symbol 406 that is preceding the guard symbol 400 (i.e., the PSSCH in the symbol 406 of FIG. 4 may be cyclically extended). In this case, the same transmit power as for the PSSCH may be used for the EBS, so that the EBS creates no receiver AGC issues for any LTE transmissions in this subframe.

In another example, the at least part of the guard symbol may comprise at least a part of a cyclic prefix of an automatic gain control symbol adjacent to the guard symbol, wherein a transmit power of the signal (EBS) may correspond to a transmit power of a physical sidelink shared channel transmission from the apparatus. For example, the EBS 403 in the guard symbol 400 may be realized as an extended cyclic prefix of the AGC symbol 401. In this case, the same transmit power as for the PSSCH may be used for the EBS in order to avoid AGC issues at the other user equipment (e.g., LTE UEs).

Figure 7:
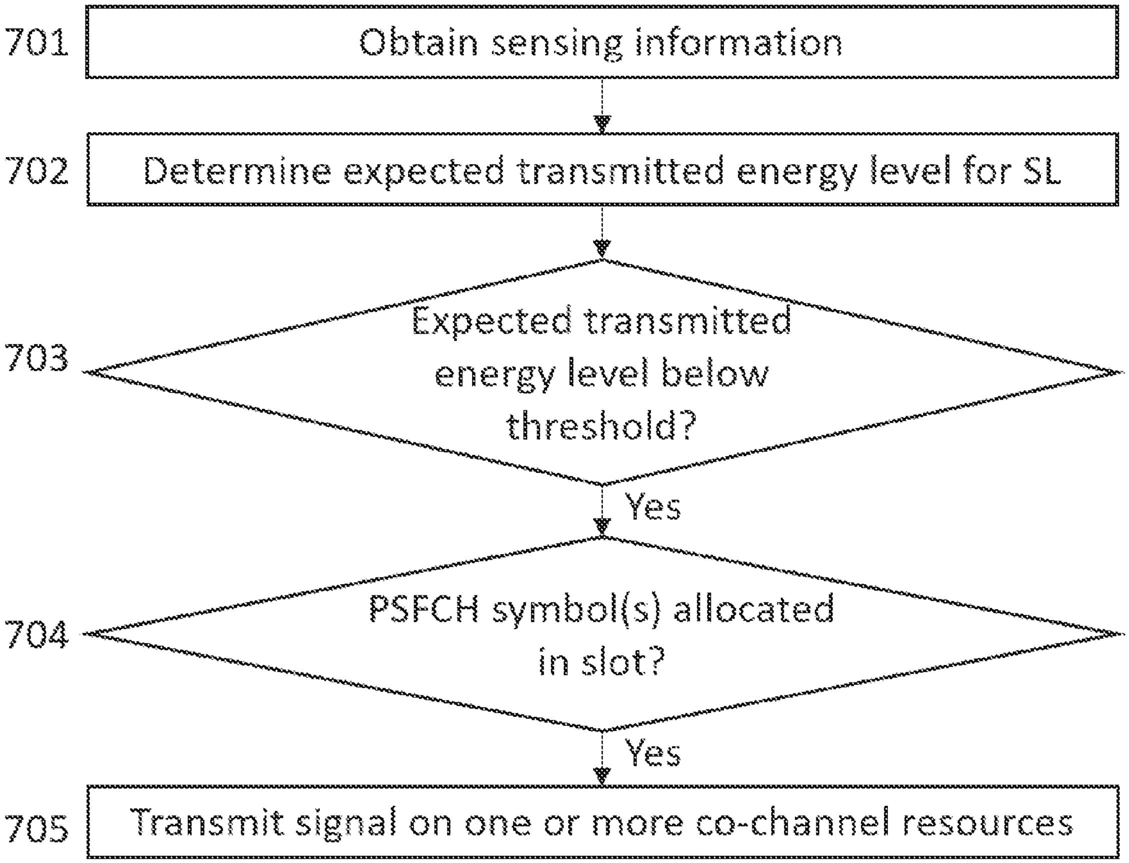
FIG. 7 illustrates a flow chart.

FIG. 7 illustrates a flow chart according to an example embodiment of a method performed by an apparatus. For example, the apparatus may be, or comprise, or be comprised in, a user equipment (UE). The user equipment may also be called a wireless communication device, a subscriber unit, a mobile station, a remote terminal, an access terminal, a user terminal, a terminal device, or user device. The apparatus may correspond to one of the UEs 100, 102 of FIG. 1, or UE1 of FIG. 5.

Referring to FIG. 7, in block 701, the apparatus obtains sensing information by monitoring sidelink control information (SCI) associated with at least one of a first radio access technology (e.g., NR) or a second radio access technology (e.g., LTE). The SCI may comprise information of reserved resources for upcoming SL transmissions (e.g., HARQ retransmissions and/or new transport block transmissions).

In block 702, the apparatus determines, based on the sensing information, an expected transmitted energy level for sidelink transmission.

In block 703, the apparatus determines whether the expected transmitted energy level is below a threshold.

In block 704, the apparatus determines whether one or more physical sidelink feedback channel symbols are allocated in at least one time slot.

In block 705, based on the expected transmitted energy level being below the threshold (block 703: yes), and based on determining that one or more physical sidelink feedback channel symbols are allocated in the at least one time slot (block 704: yes), the apparatus transmits a signal on one or more co-channel resources in the at least one time slot. The signal may refer to the EBS described above.

For example, the one or more co-channel resources may comprise at least one of: at least a part of a guard symbol in the at least one time slot (e.g., the part 403 of the guard symbol 400 in FIG. 4), or at least a part of the one or more physical sidelink feedback channel symbols in the at least one time slot (e.g., the part 405 of the PSFCH symbols 401, 402 in FIG. 4).

The transmission of the signal may cause another user equipment monitoring received energy on the one or more co-channel resources to less likely select the one or more co-channel resources for a communication. For example, the signal may be transmitted such that the probability of received energy on the one or more co-channel resources at the other user equipment being above or equal to a threshold is increased.

The apparatus may comprise at least a user equipment associated with the first radio access technology, and the other user equipment monitoring the received energy may be associated with the second radio access technology different to the first radio access technology. For example, the apparatus may be an NR SL UE, and the other user equipment may be an LTE SL UE. The apparatus may comprise the user equipment associated with both the first radio access technology and the second radio access technology. For example, in this case, the apparatus may comprise both an NR UE (NR module) and an LTE UE (LTE module).

For example, the NR SL UE (NR module) may determine whether to transmit the signal (EBS) or not based on NR SL sensing information obtained by monitoring NR SL SCI and/or based on LTE SL sensing information obtained from the LTE SL UE (LTE module) collocated in the same apparatus, and/or based on sidelink control information (SCI) from another (non-collocated) UE. For example, based on the NR SL sensing information, the NR SL UE may be able to determine the expected load or transmitted energy of SL transmissions on PSSCH, PSCCH and PSFCH resources (from one or more NR SL UEs which may include the apparatus itself). Additionally, or alternatively, based on the LTE SL sensing information, the NR SL UE may be able to determine the one or more co-channel resources in the slot where more transmitted energy is needed.

Figure 8:
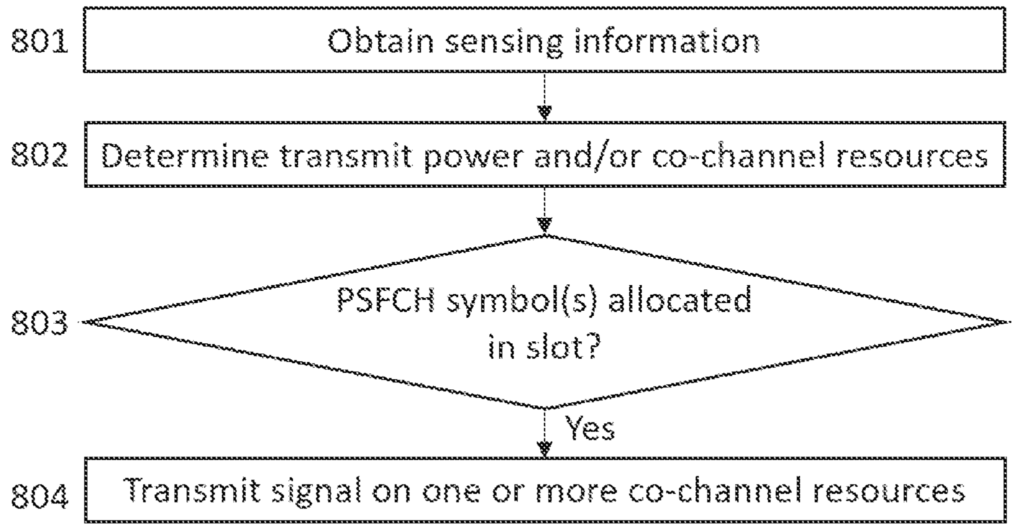
FIG. 8 illustrates a flow chart.

FIG. 8 illustrates a flow chart according to an example embodiment of a method performed by an apparatus. For example, the apparatus may be, or comprise, or be comprised in, a user equipment (UE). The user equipment may also be called a wireless communication device, a subscriber unit, a mobile station, a remote terminal, an access terminal, a user terminal, a terminal device, or user device. The apparatus may correspond to one of the UEs 100, 102 of FIG. 1, or UE1 of FIG. 5.

Referring to FIG. 8, in block 801, the apparatus obtains sensing information by monitoring sidelink control information (SCI) associated with at least one of a first radio access technology (e.g., NR) or a second radio access technology (e.g., LTE).

In block 802, the apparatus determines, based on the sensing information, at least one of: a transmit power level for transmitting a signal on one or more co-channel resources, or the one or more co-channel resources for transmitting the signal.

In block 803, the apparatus determines whether one or more physical sidelink feedback channel symbols are allocated in at least one time slot.

In block 804, based on determining that one or more physical sidelink feedback channel symbols are allocated in the at least one time slot (block 803: yes), the apparatus transmits the signal on the one or more co-channel resources in the at least one time slot. In this case, the signal may be transmitted by using the transmit power level and/or the one or more co-channel resources determined in block 802. The signal may refer to the EBS described above.

For example, the one or more co-channel resources may comprise at least one of: at least a part of a guard symbol in the at least one time slot (e.g., the part 403 of the guard symbol 400 in FIG. 4), or at least a part of the one or more physical sidelink feedback channel symbols in the at least one time slot (e.g., the part 405 of the PSFCH symbols 401, 402 in FIG. 4).

The transmission of the signal may cause another user equipment monitoring received energy on the one or more co-channel resources to less likely select the one or more co-channel resources for a communication. For example, the signal may be transmitted such that the probability of received energy on the one or more co-channel resources at the other user equipment being above or equal to a threshold is increased.

The apparatus may comprise at least a user equipment associated with the first radio access technology, and the other user equipment monitoring the received energy may be associated with the second radio access technology different to the first radio access technology. The user equipment associated with the second radio access technology may be a separate device, or the apparatus may also comprise the user equipment associated with the second radio access technology. For example, the apparatus may be an NR SL UE, and the other user equipment may be an LTE SL UE.

For example, the NR SL UE may be configured to determine at least some transmission parameters, such as the transmit power level, the amount of co-channel resources (e.g., in symbol 400 and/or symbols 401, 402 of FIG. 4), the EBS sequence, etc., for transmitting the EBS on an individual targeted slot, where PSFCH resources are allocated. This may be based on, for example, the NR SL sensing information and/or the LTE SL sensing information described above. In an embodiment, the sensing information may comprise sidelink control information (SCI) from another UE.

Figure 9:
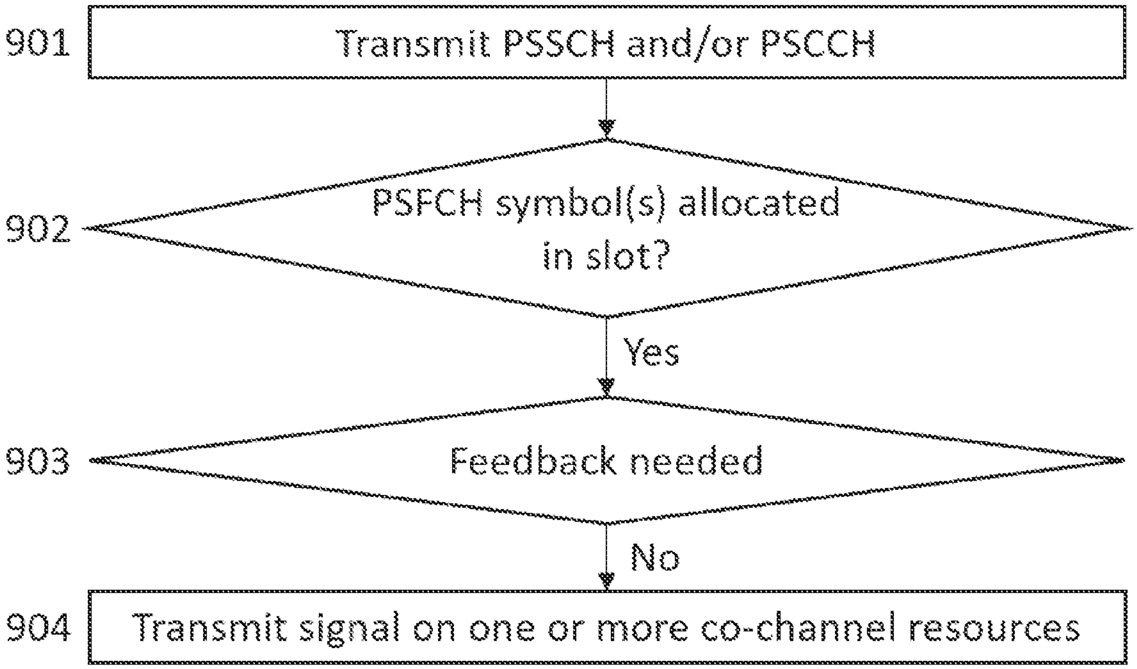
FIG. 9 illustrates a flow chart.

FIG. 9 illustrates a flow chart according to an example embodiment of a method performed by an apparatus. For example, the apparatus may be, or comprise, or be comprised in, a user equipment (UE). The user equipment may also be called a wireless communication device, a subscriber unit, a mobile station, a remote terminal, an access terminal, a user terminal, a terminal device, or user device. The apparatus may correspond to one of the UEs 100, 102 of FIG. 1, or UE1 of FIG. 5.

Referring to FIG. 9, in block 901, the apparatus transmits at least one of: physical sidelink shared channel information or physical sidelink control channel information.

In block 902, the apparatus determines whether one or more physical sidelink feedback channel symbols are allocated in at least one time slot.

In block 903, the apparatus determines whether feedback information, such as HARQ feedback, needs to be transmitted or received in the at least one time slot for the physical sidelink shared channel information or the physical sidelink control channel information.

In block 904, based on determining that one or more physical sidelink feedback channel symbols are allocated in the at least one time slot (block 902: yes), and based on determining that the feedback information does not need to be transmitted or received in the at least one time slot (block 903: no), the apparatus transmits a signal on one or more co-channel resources in the at least one time slot. The signal may refer to the EBS described above.

This way, the apparatus may prevent another user equipment (e.g., LTE UE) from selecting and reserving resources in the PSFCH subframe. For example, an NR SL UE, which transmits PSSCH and/or PSCCH in a targeted slot and does not need to receive or transmit a regular PSFCH transmission in that slot, may be configured to transmit the signal (EBS) (e.g., to protect the PSFCH transmission of other NR UEs). On the other hand, if this NR SL UE needs to transmit or receive a PSFCH transmission (e.g., HARQ feedback) in that slot, then this NR SL UE may not transmit the EBS in that slot, but another NR UE may transmit an EBS in that slot.

For example, the one or more co-channel resources may comprise at least one of: at least a part of a guard symbol in the at least one time slot (e.g., the part 403 of the guard symbol 400 in FIG. 4), or at least a part of the one or more physical sidelink feedback channel symbols in the at least one time slot (e.g., the part 405 of the PSFCH symbols 401, 402 in FIG. 4).

The transmission of the signal may cause another user equipment monitoring received energy on the one or more co-channel resources to less likely select the one or more co-channel resources for a communication. For example, the signal may be transmitted such that the probability of received energy on the one or more co-channel resources at the other user equipment being above or equal to a threshold is increased.

The apparatus may comprise at least a user equipment associated with a first radio access technology, and the other user equipment monitoring the received energy may be associated with a second radio access technology different to the first radio access technology. The user equipment associated with the second radio access technology may be a separate device, or the apparatus may also comprise the user equipment associated with the second radio access technology. For example, the apparatus may be an NR UE, and the other user equipment may be an LTE UE.

The blocks, related functions, and information exchanges (messages) described above by means of FIGS. 5-9 are in no absolute chronological order, and some of them may be performed simultaneously or in an order differing from the described one. Other functions can also be executed between them or within them, and other information may be sent, and/or other rules applied. Some of the blocks or part of the blocks or one or more pieces of information can also be left out or replaced by a corresponding block or part of the block or one or more pieces of information.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

Figure 10:
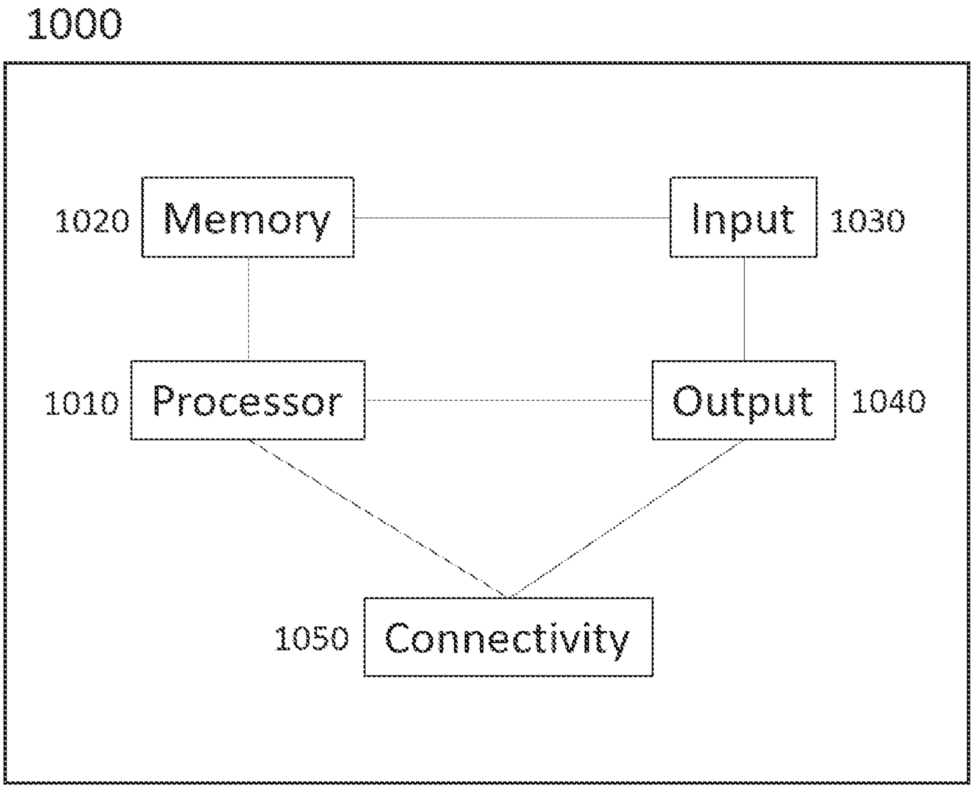
FIG. 10 illustrates an example of an apparatus.

FIG. 10 illustrates an example of an apparatus 1000 comprising means for performing one or more of the example embodiments described above. For example, the apparatus 1000 may be an apparatus such as, or comprising, or comprised in, a user equipment (UE). The user equipment may also be called a wireless communication device, a subscriber unit, a mobile station, a remote terminal, an access terminal, a user terminal, a terminal device, or user device. The apparatus may correspond to one of the UEs 100, 102 of FIG. 1, or UE1 and/or UE2 of FIG. 5.

The apparatus 1000 may comprise a circuitry or a chipset applicable for realizing one or more of the example embodiments described above. For example, the apparatus 1000 may comprise at least one processor 1010. The at least one processor 1010 interprets instructions (e.g., computer program instructions) and processes data. The at least one processor 1010 may comprise one or more programmable processors. The at least one processor 1010 may comprise programmable hardware with embedded firmware and may, alternatively or additionally, comprise one or more application-specific integrated circuits (ASICs).

The at least one processor 1010 is coupled to at least one memory 1020. The at least one processor is configured to read and write data to and from the at least one memory 1020. The at least one memory 1020 may comprise one or more memory units. The memory units may be volatile or non-volatile. It is to be noted that there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The term "non-transitory," as used herein, is a limitation of the medium itself (i.e., tangible, not a signal) as opposed to a limitation on data storage persistency (e.g., RAM vs. ROM). The at least one memory 1020 stores computer readable instructions that are executed by the at least one processor 1010 to perform one or more of the example embodiments described above. For example, non-volatile memory stores the computer readable instructions, and the at least one processor 1010 executes the instructions using volatile memory for temporary storage of data and/or instructions. The computer readable instructions may refer to computer program code.

The computer readable instructions may have been pre-stored to the at least one memory 1020 or, alternatively or additionally, they may be received, by the apparatus, via an electromagnetic carrier signal and/or may be copied from a physical entity such as a computer program product. Execution of the computer readable instructions by the at least one processor 1010 causes the apparatus 1000 to perform one or more of the example embodiments described above. That is, the at least one processor and the at least one memory storing the instructions may provide the means for providing or causing the performance of any of the methods and/or blocks described above.

In the context of this document, a "memory" or "computer-readable media" or "computer-readable medium" may be any non-transitory media or medium or means that can contain, store, communicate, propagate or transport the instructions for use by or in connection with an instruction execution system, apparatus, or device, such as a computer. The term "non-transitory," as used herein, is a limitation of the medium itself (i.e., tangible, not a signal) as opposed to a limitation on data storage persistency (e.g., RAM vs. ROM).

The apparatus 1000 may further comprise, or be connected to, an input unit 1030. The input unit 1030 may comprise one or more interfaces for receiving input. The one or more interfaces may comprise for example one or more temperature, motion and/or orientation sensors, one or more cameras, one or more accelerometers, one or more microphones, one or more buttons and/or one or more touch detection units. Further, the input unit 1030 may comprise an interface to which external devices may connect to.

The apparatus 1000 may also comprise an output unit 1040. The output unit may comprise or be connected to one or more displays capable of rendering visual content, such as a light emitting diode (LED) display, a liquid crystal display (LCD) and/or a liquid crystal on silicon (LCoS) display. The output unit 1040 may further comprise one or more audio outputs. The one or more audio outputs may be for example loudspeakers.

The apparatus 1000 further comprises a connectivity unit 1050. The connectivity unit 1050 enables wireless connectivity to one or more external devices. The connectivity unit 1050 comprises at least one transmitter and at least one receiver that may be integrated to the apparatus 1000 or that the apparatus 1000 may be connected to. The at least one transmitter comprises at least one transmission antenna, and the at least one receiver comprises at least one receiving antenna. The connectivity unit 1050 may comprise an integrated circuit or a set of integrated circuits that provide the wireless communication capability for the apparatus 1000. Alternatively, the wireless connectivity may be a hardwired application-specific integrated circuit (ASIC). The connectivity unit 1050 may also provide means for performing at least some of the blocks of one or more example embodiments described above. The connectivity unit 1050 may comprise one or more components, such as: power amplifier, digital front end (DFE), analog-to-digital converter (ADC), digital-to-analog converter (DAC), frequency converter, (de)modulator, and/or encoder/decoder circuitries, controlled by the corresponding controlling units.

It is to be noted that the apparatus 1000 may further comprise various components not illustrated in FIG. 10. The various components may be hardware components and/or software components.

As used in this application, the term "circuitry" may refer to one or more or all of the following: a) hardware-only circuit implementations (such as implementations in only analog and/or digital circuitry); and b) combinations of hardware circuits and software, such as (as applicable): i) a combination of analog and/or digital hardware circuit(s) with software/firmware and ii) any portions of hardware processor(s) with software (including digital signal processor(s), software, and memory(ies) that work together to cause an apparatus, such as a mobile phone, to perform various functions); and c) hardware circuit(s) and/or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of example embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the example embodiments described above, but may vary within the scope of the claims. Therefore, all words and expressions should be interpreted broadly, and they are intended to illustrate, not to restrict, the embodiments.

What is claimed is:

1. An apparatus comprising at least one processor, and at least one memory storing instructions that, when executed by the at least one processor, cause the apparatus at least to:

determine whether one or more physical sidelink feedback channel symbols are allocated in at least one time slot; and transmit, based on the determination, a signal on one or more co-channel resources in the at least one time slot, wherein the one or more co-channel resources comprise: at least a part of a guard symbol in the at least one time slot, and at least a part of the one or more physical sidelink feedback channel symbols in the at least one time slot, wherein the at least part of the guard symbol comprises a part of a physical sidelink shared channel transmission, wherein a transmit power of the signal corresponds to a transmit power of the physical sidelink shared channel transmission.

2. The apparatus according to claim 1, wherein the transmission of the signal causes a user equipment monitoring received energy on the one or more co-channel resources to less likely select the one or more co-channel resources for a communication.

3. The apparatus according to claim 2, wherein the signal is transmitted such that a probability of received energy on the one or more co-channel resources at the user equipment being above or equal to a threshold is increased.

4. The apparatus according to claim 2, wherein the apparatus comprises a user equipment associated with a first radio access technology, and wherein the user equipment monitoring the received energy is associated with a second radio access technology different to the first radio access technology.

5. The apparatus according to claim 4, wherein the user equipment is associated with both the first radio access technology and the second radio access technology.

6. The apparatus according to claim 4, further being caused to:

obtain sensing information by monitoring sidelink control information associated with at least one of the first radio access technology or the second radio access technology;

determine, based on the sensing information, an expected transmitted energy level for sidelink transmission; and determine, based on the expected transmitted energy level being below a threshold, to transmit the signal.

7. The apparatus according to claim 6, further being caused to:

determine, based on the sensing information, at least one of: a transmit power level for transmitting the signal, or the one or more co-channel resources.

8. The apparatus according to claim 4, wherein the signal and the one or more co-channel resources are based on a pre-defined configuration shared between a plurality of user equipment associated with the first radio access technology.

9. The apparatus according to claim 1, wherein the signal comprises a sequence that comprises information other than feedback information, wherein the sequence is transmitted on the one or more physical sidelink feedback channel symbols.

10. The apparatus according to claim 1, wherein the at least part of the guard symbol comprises at least a part of a cyclic prefix of an automatic gain control symbol adjacent to the guard symbol, and wherein a transmit power of the signal corresponds to a transmit power of a physical sidelink shared channel transmission from the apparatus.

11. The apparatus according to claim 1, further being caused to:

transmit at least one of: physical sidelink shared channel information or physical sidelink control channel information; and determine whether feedback information needs to be transmitted or received in the at least one time slot for the physical sidelink shared channel information or the physical sidelink control channel information, wherein the signal is transmitted based on determining that the feedback information does not need to be transmitted or received in the at least one time slot.

12. A method comprising:

determining whether one or more physical sidelink feedback channel symbols are allocated in at least one time slot; and transmitting, based on the determination, a signal on one or more co-channel resources in the at least one time slot, wherein the one or more co-channel resources comprise: at least a part of a guard symbol in the at least one time slot, and at least a part of the one or more physical sidelink feedback channel symbols in the at least one time slot, wherein the at least part of the guard symbol comprises a part of a physical sidelink shared channel transmission, wherein a transmit power of the signal corresponds to a transmit power of the physical sidelink shared channel transmission.

13. The method of claim 12, wherein the transmission of the signal causes a user equipment monitoring received energy on the one or more co-channel resources to less likely select the one or more co-channel resources for a communication, wherein the signal is transmitted such that a probability of received energy on the one or more co-channel resources at the user equipment being above or equal to a threshold is increased.

14. The method according to claim 13, further comprising:

obtaining sensing information by monitoring sidelink control information associated with at least one of a first radio access technology or a second radio access technology;

determining, based on the sensing information, an expected transmitted energy level for sidelink transmission; and determining, based on the expected transmitted energy level being below a threshold, to transmit the signal.

15. The method according to claim 14, further comprising:

determining, based on the sensing information, at least one of: a transmit power level for transmitting the signal, or the one or more co-channel resources.

16. The method according to claim 12, wherein the signal comprises a sequence that comprises information other than feedback information, wherein the sequence is transmitted on the one or more physical sidelink feedback channel symbols.

17. A non-transitory computer readable medium comprising program instructions which, when executed by an apparatus, cause the apparatus to perform at least the following:

determining whether one or more physical sidelink feedback channel symbols are allocated in at least one time slot; and transmitting based on the determination, a signal on one or more co-channel resources in the at least one time slot, wherein the one or more co-channel resources comprise: at least a part of a guard symbol in the at least one time slot, and at least a part of the one or more physical sidelink feedback channel symbols in the at least one time slot, wherein the at least part of the guard symbol comprises a part of a physical sidelink shared channel transmission, wherein a transmit power of the signal corresponds to a transmit power of the physical sidelink shared channel transmission.

* * * * *